United States Patent [19]
Iguchi

[11] Patent Number: 5,826,471
[45] Date of Patent: Oct. 27, 1998

[54] CUTTING METHOD FOR COIL CONDUCTOR

[75] Inventor: Mikio Iguchi, Himeji, Japan

[73] Assignee: Mitsubishi Denki Kabushika Kaisha, Tokyo, Japan

[21] Appl. No.: 854,676

[22] Filed: May 12, 1997

Related U.S. Application Data

[62] Division of Ser. No. 496,755, Jun. 29, 1995, Pat. No. 5,664,472.

[51] Int. Cl.$^6$ .................. B26D 3/16; B26D 5/20
[52] U.S. Cl. .................. 83/51; 83/216; 83/638; 83/647; 83/218
[58] Field of Search .................. 83/13, 18, 19, 83/20, 51, 205, 215, 216, 218, 255, 285, 303, 315, 318, 647, 647.5, 638, 613, 642, 618, 556, 558, 640, 694

[56] References Cited

U.S. PATENT DOCUMENTS

| | | | |
|---|---|---|---|
| 370,287 | 9/1887 | Sterling | 83/642 X |
| 723,599 | 11/1903 | Grimm | 83/638 X |
| 2,498,249 | 2/1950 | Cook | 83/318 X |
| 3,476,001 | 11/1969 | Schluter | 83/285 X |
| 3,648,556 | 3/1972 | Hamilton et al. | 83/262 X |
| 3,811,354 | 5/1974 | Ito | 83/285 X |
| 4,480,456 | 11/1984 | Iwase et al. | 83/318 X |
| 4,640,164 | 2/1987 | Pavlov | 83/285 X |
| 4,919,025 | 4/1990 | Snyder | 83/647.5 X |
| 4,939,967 | 7/1990 | Wallis | 83/318 X |
| 5,085,625 | 2/1992 | Kojima | 83/630 X |
| 5,561,899 | 10/1996 | Carpenter et al. | 83/51 X |
| 5,664,472 | 9/1997 | Iguchi | 83/216 |

FOREIGN PATENT DOCUMENTS

| | | | |
|---|---|---|---|
| 202498 | 10/1908 | Germany | 83/642 |
| 115160 | 9/1981 | Japan . | |
| 0064215 | 4/1984 | Japan | 83/285 |
| 0172412 | 9/1985 | Japan | 83/318 |

*Primary Examiner*—Rinaldi I. Rada
*Assistant Examiner*—Boyer Ashley
*Attorney, Agent, or Firm*—Sughrue, Mion, Zinn, Macpeak & Seas, PLLC

[57] ABSTRACT

A method for cutting a coil conductor in which a halted conductor wire 2 to be formed into a coil is served by cutting edges 5A, 5B, while simultaneously advancing a cutting edges downstream in the feed direction of the wire. Thus, a pushing back force against the conductor wire and its attendant deformation is prevented when cutting it, whereby the dimensions of the conductor wire are stabilized.

5 Claims, 8 Drawing Sheets

CUTTING METHOD FOR COIL CONDUCTOR

This is a divisional of application Ser. No. 08/496,755 filed Jun. 29, 1995, now U.S. Pat. No. 5,664,472.

BACKGROUND OF THE INVENTION

1. Field of the Invention

The present invention relates to a cutting method and a cutter apparatus for cutting a coil conductor to be used, for example, in an armature coil of an engine starter.

2. Description of the Related Art

FIG. 7 schematically shows the construction of a conventional cutter apparatus for coil conductor such as disclosed in Japanese Patent Publication No. 62-48471. In this figure, a coil conductor 2 having a circular cross section contained in a bobbin 1 is drawn out from the bobbin 1 by a predetermined amount by means of feed rollers 3 and then is brought to a halt. Insulating film on its periphery is scraped of for a range of length 2 L by a helical reamer 4. Thereafter, the coil conductor 2 is severed at the center of the 2 L range by a pair of cutting edges 5A, 5B. Thus, as shown in FIG. 8, of the severed coil conductor 2, the insulating film has been scraped off for a length L at each end. Further, the coil conductor 2 drawn out from the bobbin 1 is removed of its warping by straightening rollers 6.

The severed coil conductor 2 is formed into a shape for example shown in FIG. 9 and is inserted into a slot 7a of an armature core 7 as shown in FIG. 10. Thereafter, as shown in FIG. 11, the portion of the coil conductor 2 penetrating through the armature core 7 is formed and the portions with the insulating film being scraped off are connected to a commutator 8. In this manner, the armature for an engine starter is assembled.

FIG. 12 schematically illustrates the method of cutting by the apparatus of FIG. 7. A terminal end of the coil conductor 2 is grasped by a catcher 9 so that it may be advanced or pulled away after sereving. Cutting edges 5A, 5B are connected to driving shafts 11A, 11B through cutting eccentric cam mechanisms 10A, 10B, respectively. Rotation of the driving shafts 11A, 11B is converted into a linear movement of the cutting edges 5A, 5B by the cutting eccentric cam mechanisms 10A, 10B.

FIG. 13 is an enlarged view showing the state of cutting the coil conductor of FIG. 2. The cutting edges 5A, 5B are moved in the direction perpendicular to the feeding direction of the coil conductor 2 so as to cut the coil conductor 2. Further, the tool angle at each of the cutting edges 5A, 5B is 90°. The reason for this is that both end portions of the coil conductor 2 after the severance are sharpened so that its insertion into the slot 7a of the armature core 7 is smooth.

In the conventional cutting method of the coil conductor 2 as described above, though feeding of the coil conductor 2 comes to a halt at the time of its cutting, since the cutting edges 5A, 5B are moved perpendicularly with respect to the coil conductor 2, the coil conductor 2 located upstream of the cutting edges 5A, 5B is pressed backwards or push-cammed in a direction opposite to its feeding by the tool surfaces of the cutting edges 5A, 5B. At this time, since the "reverse movement" of the coil conductor 2 in the direction opposite to its feeding is restricted by the feed roller 3, the coil conductor 2 is deflected as shown in FIG. 13 to result in a bending of the coil conductor 2 or unstable dimensions of the coil conductor 2 after the severance. Further, a pressing force is exerted on the cutting edges 5A, 5B from the coil conductor 2, causing a premature wear or noise of the cutting edges 5A, 5B.

On the other hand, the coil conductor 2 downstream of the cutting edges 5A, 5B, though it is pushed in the direction of its feeding when being cut, causes no problem, since the catcher 9 does not restrict the movement in the feeding direction of the coil conductor 2.

SUMMARY OF THE INVENTION

To solve the above problems, it is an object of the present invention to provide a cutting method and a cutter apparatus for coil conductor in which deformation of the coil conductor may be prevented.

In one aspect of the present invention, a cutting method for coil conductor includes the steps of: halting a coil conductor after feeding it by a predetermined amount; and, while feeding cutting edges downstream along the coil conductor, cutting the halted coil conductor by the cutting edges.

In another aspect of the invention, a cutter apparatus for coil conductor comprises: cutting means having cutting edges for cutting a coil conductor halted after being fed by a predetermined amount; and feed means for feeding the cutting edges downstream of the coil conductor when cutting the coil conductor by the cutting means.

In a further aspect of the invention, a cutter apparatus for coil conductor comprises: a cutting edge for cutting a coil conductor halted after being fed by a predetermined amount; a guide member disposed diagonally with respect to the coil conductor for guiding the cutting edge diagonally downstream of the coil conductor when cutting the coil conductor; and driving means for moving the cutting edge along the guide member.

DESCRIPTION OF THE PREFERRED EMBODIMENTS

Figure 1:
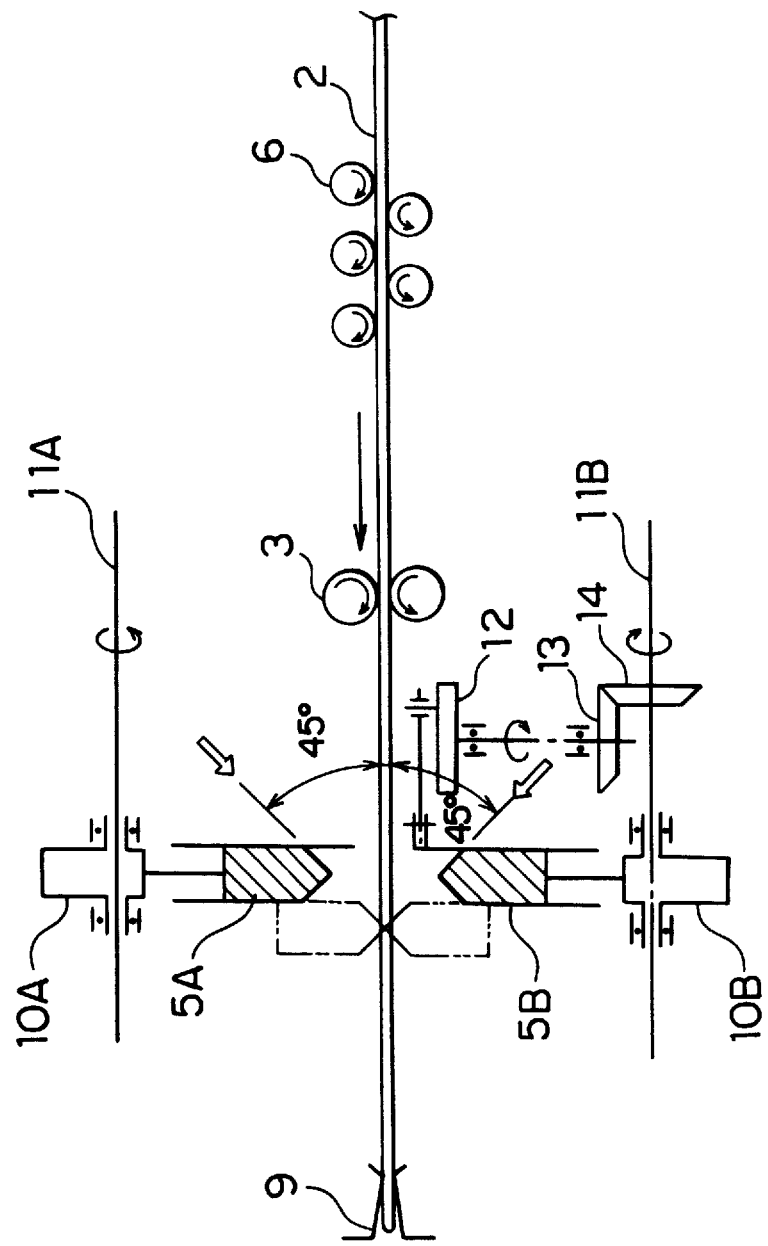
FIG. 1 schematically illustrates the cutting method for a coil conductor according to an embodiment of the present invention.
Figure 2:
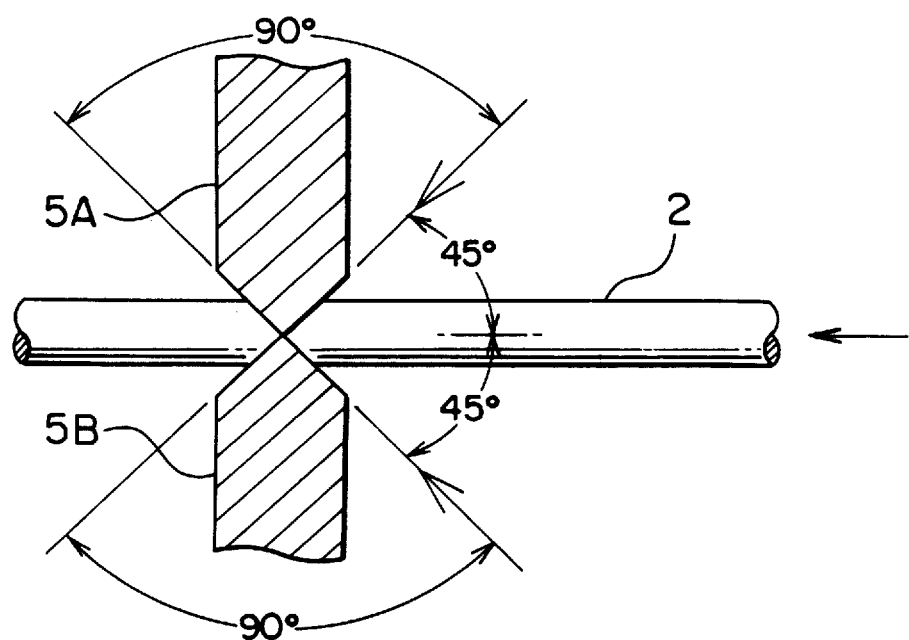
FIG. 2 shows in an enlarged manner the state where the coil conductor of FIG. 1 has been cut.

An embodiment of the present invention will be described below with reference to the drawings. FIG. 1 is a schematic view illustrating a cutting method for a coil conductor according to an embodiment of the present invention. FIG. 2 shows in an enlarged manner the state where the coil conductor of FIG. 1 has been cut.

In these figures, cutting eccentric cam mechanisms 10A, 10B for causing cutting operation of cutting edges 5A, 5B are linked with each other and are capable of simultaneously moving along driving shafts 11A, 11B, respectively. A feeding crank mechanism 12 for moving the cutting eccentric cam mechanisms 10A, 10B along the driving shafts 11A, 11B is connected to the driving shaft 11B through a set of bevel gears 13, 14.

The cutting means is constituted generally by the cutting edges 5A. 5B, cutting eccentric cam mechanisms 10A, 10B and driving shafts 11A, 11B. Further, the feed means is constituted generally by the feeding crank mechanism 12 and the bevel gears 13, 14.

Here, the cutting edges 5A, 5B sever the coil conductor 2 while traveling in the feeding direction of the coil conductor 2 at an angle of 45°. In other words, as shown also in FIG. 2, since the tool angle of each of the cutting edges 5A, 5B is 90°, the cutting edges 5A, 5B are moved along the tool surface on the upstream side of the coil conductor 2 when the coil conductor 2 is being cut.

Accordingly, a force pushing back the coil conductor 2 does not occur at the time of cutting, so that deformation of the coil conductor 2 is prevented and the dimensions of the coil conductor 2 are stabilized. Further, no pushing force is exerted on the cutting edges 5A, 5B from the coil conductor 2, thereby preventing a premature wear or an occurrence of noise of the cutting edges 5A, 5B.

Figure 3:
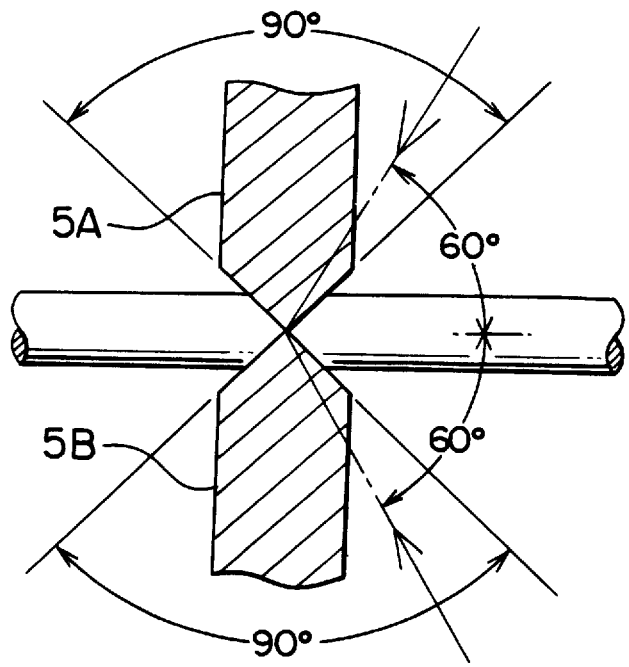
FIG. 3 shows an example where the feed angle of FIG. 2 is modified.
Figure 13:
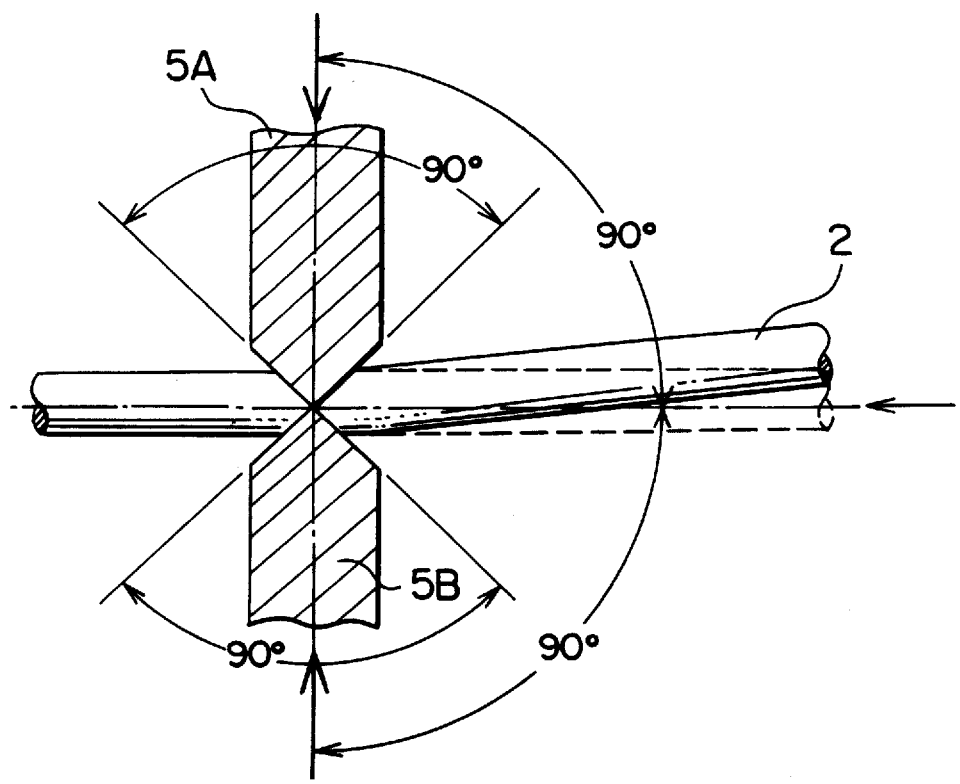
FIG. 13 shows in an enlarged manner the state where the coil conductor of FIG. 12 has been cut.

It should be noted that, while the traveling angle of the cutting edges 5A, 5B is set to 45° in the example of FIG. 2, it is also possible to move them at an angle, for example 60° as shown in FIG. 3, which is larger than the angle between the tool surface and the coil conductor 2. Although a little more pressing force against the coil conductor 2 is added compared to the example of FIG. 2, deformation of the coil conductor 2 is prevented when compared to the conventional example shown in FIG. 13. Further, it is also possible to move them at an angle smaller than the angle between the tool surface and the coil conductor 2. However, if the traveling angle is set equal to the angle between the tool surface and the coil conductor 2, no useless pressing or tensile force is applied to the coil conductor 2, an increase in space due to an excessive feed is prevented and a smooth cut surface is achieved.

Figure 4:
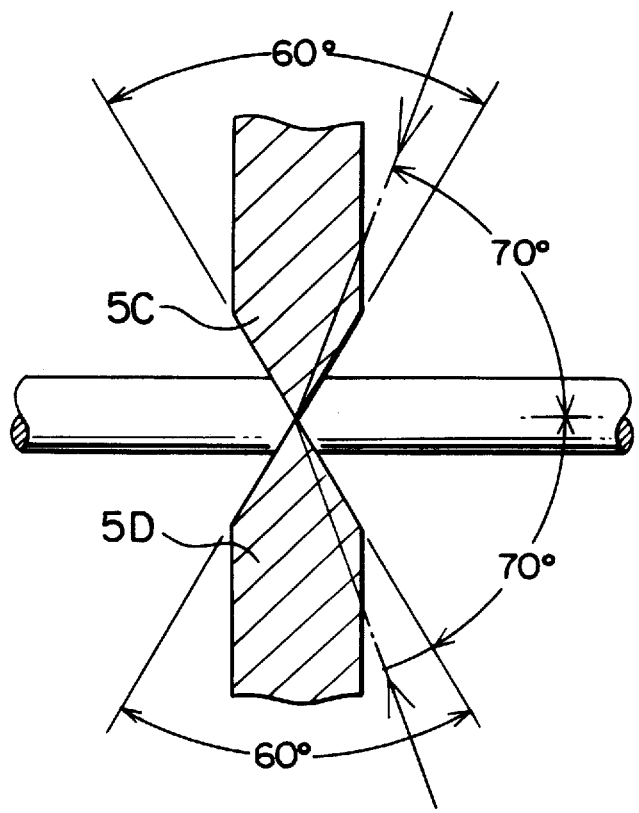
FIG. 4 shows an example where the tool angle and feed angle of FIG. 2 are modified.

Further, FIG. 4 shows an example where the cutting edges 5C, 5D having a tool angle of 60° are used and the traveling angle is set to 70°. In this manner, various modifications of the tool angle and traveling angle are possible.

Furthermore, cross section of the coil conductor 2 is not limited to a circle and, for example, it may have a rectangular section. However, while a conductor having a rectangular cross section may be cut also by a shearing force, the coil conductor 2 having a circular section must be cut by using the cutting edges 5A, 5B having a triangular edge and application of the present invention thereto is particularly effective.

Figure 5:
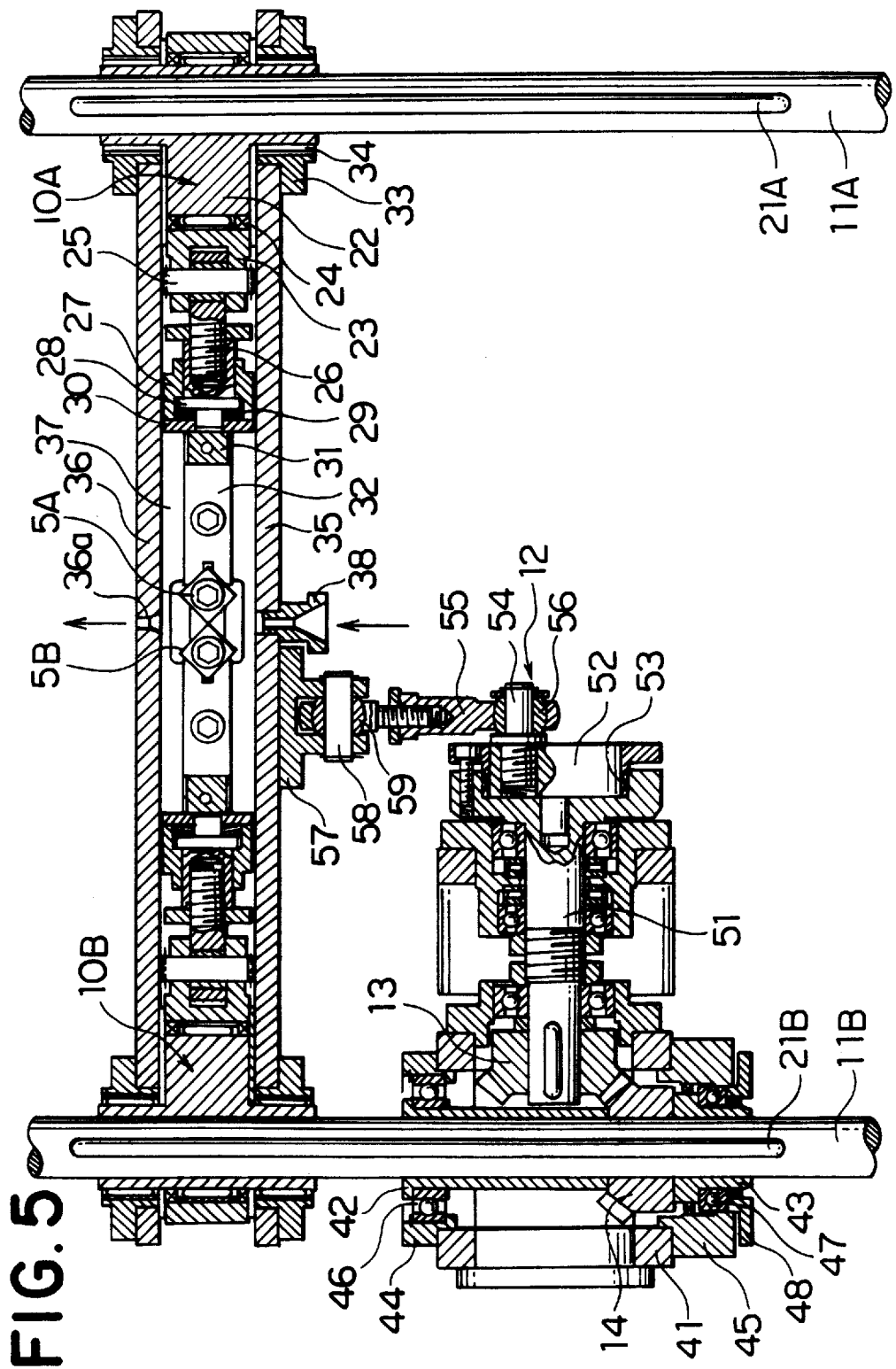
FIG. 5 is a sectional view showing in detail the construction of the cutter apparatus of FIG. 1.

The construction of a cutter apparatus of the present invention will now be described in detail. FIG. 5 is a sectional view showing the detailed construction of the cutter apparatus of FIG. 1. In this figure, sliding keys 21A, 21B extended in the axial direction are provided, respectively, on the driving shafts 11A, 11B which are parallel to each other and are attached to a base (not shown) so that they cannot be moved in the axial direction.

An eccentric cam body 22 is attached for a sliding movement on the driving shaft 11A. Further, the eccentric cam body 22 is rotated integrally with the driving shaft 11A. The eccentric cam body 22 is accommodated in a housing 23. A needle bearing 24 for allowing rotation of the eccentric cam body 22 within the housing 23 is provided between the housing 23 and the cam body 22. A connector 26 is linked with the housing 23 through a pin 25. The cutting eccentric cam mechanism 10A includes the eccentric cam body 22, housing 23, needle bearing 24, pin 25 and connector 26.

One end portion of the connector 26 is inserted into a spring case 27. A slide adjuster 28 and a disc spring 29 are accommodated in the spring case 27. A cutter adjusting bracket 30 adjacent to the spring case 27 is being pushed by the disc spring 29. A cutter adjusting wedge 31 is provided between a cutting edge holder 32 for holding the cutting edge 5A and the cutter adjusting bracket 30.

A housing 33 is provided on the outer periphery of both axial end portions of the eccentric cam body 22 through a needle bearing 34. A pair of side plates 35, 36 facing each other are attached to the housing 33 and the members connected between the eccentric cam body 22 and the cutting edge 5A are accommodated between these side plates 35, 36. A slider 37 is disposed respectively between the side plates 35, 36 and the cutter holder 32.

Since the structure for mounting the cutting edge 5B to the driving shaft 11B is identical to that for the cutting edge 5A, a description thereof will be omitted.

The side plates 35, 36 are provided in a manner extended between the driving shafts 11A, 11B, and serve as a linking portion between the cam mechanism 10A, 10B. A line guide 38 serving as an inlet for the coil conductor 2 (FIG. 1) is mounted on the center portion of the side plate 35. Further, an outlet 36a for the coil conductor 2 is provided at the center portion of the side plate 36.

A bevel gear 14 is provided on the driving shaft 11B. The bevel gear 14 and the bevel gear 13 for meshing with the bevel gear 14 are accommodated in a gear case 41. Sleeves 42, 43 for restricting the axial movement of the bevel gear 14 are attached to the driving shaft 11B. Housings 44, 45 are mounted on both end portions of the gear case 41. A ball bearing 46 is provided between the housing 44 and the sleeve 42. A thrust bearing 47 is provided between the housing 45 and the sleeve 43. A bearing holder 48 is attached to an axial end portion of the housing 45.

The bevel gear 13 is firmly fixed to one end portion of a coupling shaft 51 which is extended in a direction perpendicular to the driving shaft 11B. An eccentric shaft 52 is provided on the other end portion of the shaft 51. A Power Lok® 53 for adjusting timing is provided between the eccentric shaft 52 and the other end portion of the shaft 51. A stepped pin 54 is fixed to an eccentric position with respect to the rotating center of the eccentric shaft 52 in parallel to both the shaft 51 and eccentric shaft 52.

A rod 55 is rotatably connected to the stepped pin 54 through a rod end bearing 56. A pin holder 57 is connected to the terminal end portion of the rod end bearing 56 through a hinge pin 58 and a rod and bearing 59. The pin bolder 57 is fixed to the side plate 35.

The feed crank mechanism 12 thus includes the shaft 51, eccentric shaft 52, Power Lok® 53, stepped pin 54, rod 55, rod end bearing 56, pin holder 57, hinge pin 58 and rod end bearing 59.

In the cutter apparatus as described above, by rotating the driving shafts 11A, 11B, the cutting edges 5A, 5B are moved in the left and right direction as shown in FIG. 5 to cut the coil conductor 2. At this time, the bevel gear 14 is rotated together with the driving shaft 11B, so as to rotate the bevel gear 13 and the shaft 51. Upon rotation of the shaft 51, the rod 55) is moved in an up and down direction as shown in FIG. 5, and the side plate 35 is moved up and down as shown in FIG. 5 through the pin 58 and pin holder 57.

Since the side plate 35 is provided between the two cutting eccentric cam mechanisms 10A, 10B, the cutting eccentric cam mechanisms 10A, 10B and the cutting edges 5A, 5B as a whole are moved along the driving shafts 11A, 11B. Accordingly, by suitably setting amount of eccentricity of the eccentric cam body 22 or the cutting eccentric cam mechanism 10A, 10B and amount of eccentricity of the stepped pin 54 of the feed crank mechanism 12, timing of the cutting operation of the cutting edges 5A, 5B and operation timing of the rod 55 are previously adjusted to achieve their synchronization. It is thereby possible to perform a feed-in operation of the cutting edges 5A, 5B as shown in FIG. 1.

In order to achieve a balanced movement of the left and right cutting eccentric cam mechanisms 10A, 10B, the pin holder 57 is preferably disposed near the center of the side plate 35 which serves as the connecting portion between the cutting eccentric cam mechanisms 10A, 10B.

Further, while, in the above embodiment, the cutting operation and the feed-in operation are mechanically linked by using the bevel gears 13, 14, such driving link may be provided by other mechanism. Further, it is also possible to electrically control each of the cutting operation and the feeding operation to achieve their coordinated movement without a mechanical linkage.

Figure 6:
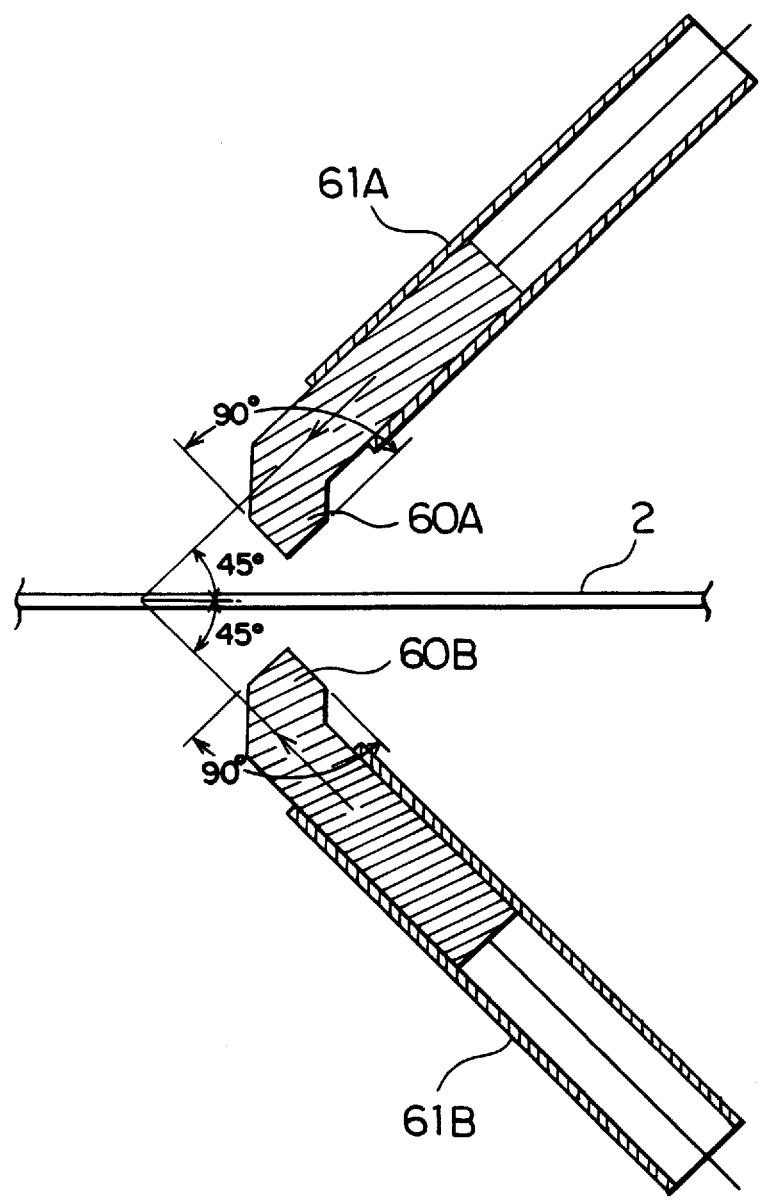
FIG. 6 is a schematic sectional view showing a cutter apparatus for coil conductor according to another embodiment of the present invention.
Figure 7:
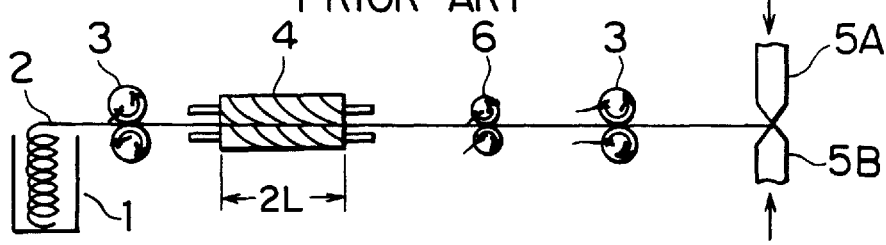
FIG. 7 schematically shows the construction of a conventional cutter apparatus for the coil conductor.
Figure 8:
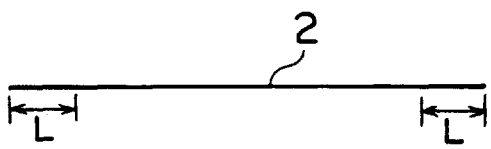
FIG. 8 shows a coil conductor severed by the apparatus of FIG. 7.
Figure 9:
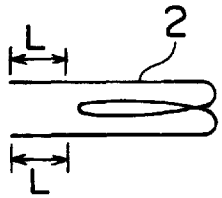
FIG. 9 shows the coil conductor of FIG. 8 in its state being bent.
Figure 10:
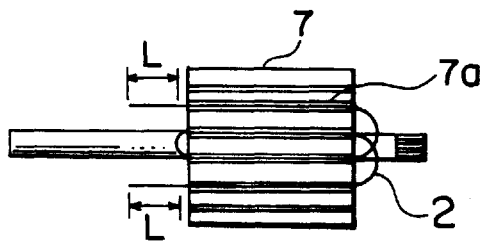
FIG. 10 is a side view showing the coil conductor of FIG. 9 in its state being inserted into the slot of an armature core
Figure 11:
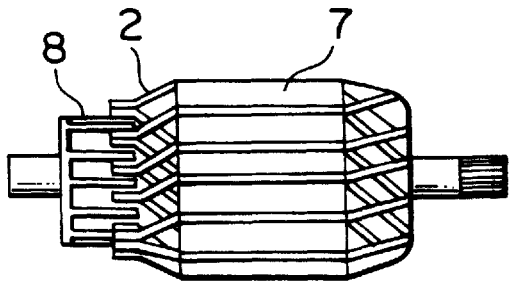
FIG. 11 is a side view showing the coil conductor of FIG. 10 in its state being connected to a commutator.
Figure 12:
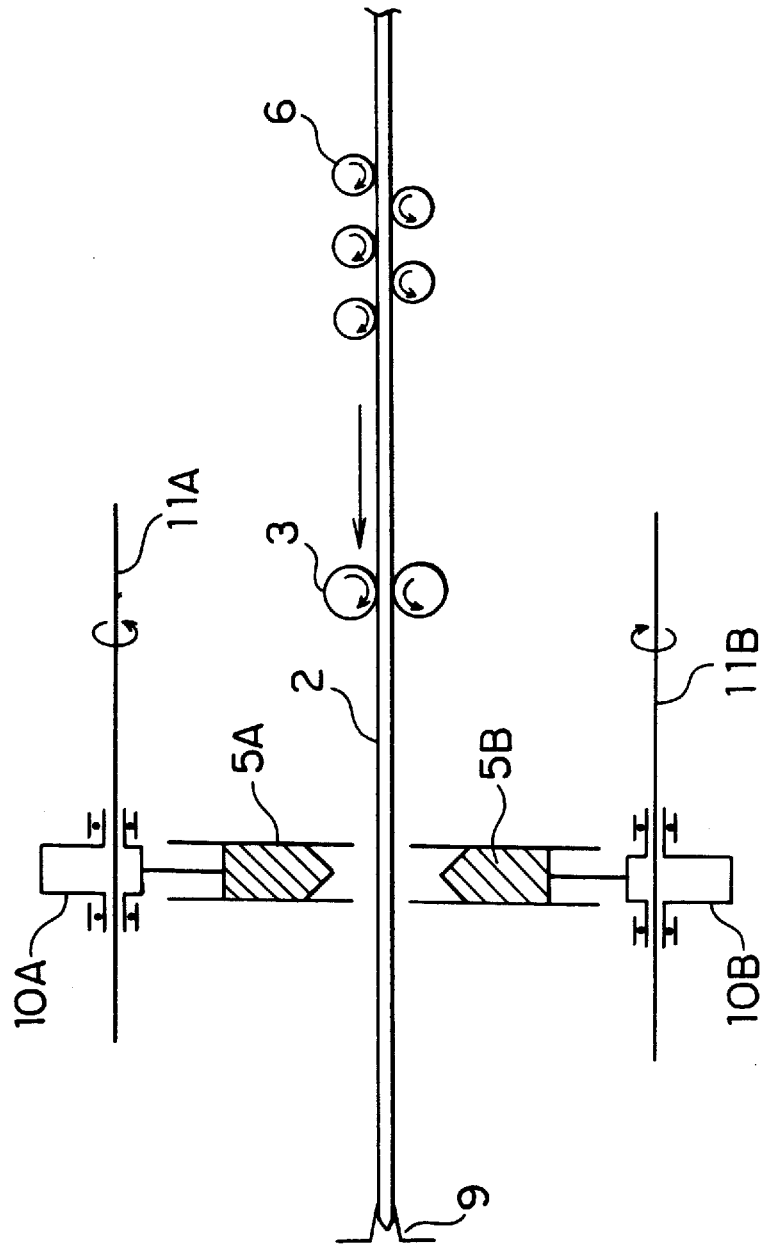
FIG. 12 schematically illustrates the cutting method by the apparatus of FIG. 7.

FIG. 6 is a schematic sectional view showing a cutter apparatus for coil conductor according to another embodiment of the present invention. In this figure, a cutting operation is performed by a pair of cutting edges 60A, 60B having a tool angle of 90° as they are moved diagonally downstream with respect to the coil conductor 2, respectively, by air cylinders 61A, 61B each serving as both a guide member and a driving means. The air cylinders 61A, 61B, are each disposed at an angle of 45° with respect to the coil conductor 2.

The construction of such apparatus is simple, since the cutting edges 60A, 60B directly receive the driving force from the air cylinders 61A, 61B.

What is claimed is:

1. A method for cutting a coil conductor, comprising the ordered steps of:
   a) linearly infeeding a coil conductor by a predetermined amount,
   b) halting the coil conductor;
   c) feeding linearly reciprocable cutting edges disposed on opposite sides of the coil conductor in a downstream direction, and
   d) simultaneously with step c), moving the cutting edges inwardly, towards each other, to cut the halted coil conductor, thereby preventing the cutting edges from push-camming an end of the coil conductor being severed in an upstream direction.

2. A method according to claim 1, wherein said cutting edges are moved with respect to said coil conductor at an angle smaller than an angle between a tool surface of the cutting edges on an upstream side of the coil conductor and said coil conductor.

3. A method according to claim 1, wherein said cutting edges are moved with respect to said coil conductor at an angle corresponding to a tool surface of the cutting edges on an upstream side of the coil conductor.

4. A method according to claim 1, wherein said cutting edges are moved with respect to said coil conductor at an angle larger than an angle between a tool surface of the cutting edges on an upstream side of the coil conductor and said coil conductor, but smaller than 90°.

5. A method for cutting a coil conductor, comprising the ordered steps of:
   a) linearly infeeding a predetermined length of a coil conductor to be cut,
   b) halting said coil conductor,
   c) advancing a pair of linearly reciprocable cutting edges disposed on opposite sides of the coil conductor in a direction downstream of said infed coil conductor and parallel thereto, and
   d) simultaneously with step c) and in synchronism therewith, moving the cutting edges inwardly, towards each other, to cut the halted coil conductor, thereby preventing the cutting edges from push-camming an end of the coil conductor being cut in an upstream direction.

* * * * *